United States Patent [19]

Niwa et al.

[11] Patent Number: 4,673,554

[45] Date of Patent: Jun. 16, 1987

[54] METHOD OF PURIFYING TANTALUM

[75] Inventors: Kenji Niwa; Ichiro Ichikawa, both of Chiba, Japan

[73] Assignee: Sumitomo Chemical Company, Limited, Osaka, Japan

[21] Appl. No.: 808,767

[22] Filed: Dec. 13, 1985

[30] Foreign Application Priority Data

Dec. 18, 1984 [JP] Japan ................................. 59-267029

[51] Int. Cl.$^4$ .............................................. C01G 35/00
[52] U.S. Cl. ................................... 423/63; 75/101 BE
[58] Field of Search ....................... 423/63; 75/101 BE

[56] References Cited

U.S. PATENT DOCUMENTS

| 3,976,475 | 8/1976 | Markland | 423/63 |
| 4,446,115 | 5/1984 | Endo et al. | 423/63 |
| 4,446,116 | 5/1984 | Krismer et al. | 423/63 |

OTHER PUBLICATIONS

Marcus et al, "Ion Exchange and Solvent Extractions of Metal Complexes", Wiley-Interscience, N.Y., 1969, pp. 737–757.

Primary Examiner—H. T. Carter
Attorney, Agent, or Firm—Sughrue, Mion, Zinn, Macpeak, and Seas

[57] ABSTRACT

A method for obtaining high-purity tantalum pentoxide is disclosed, which comprises the following steps:

dissolving a crude tantalum-containing compound in an acid containing hydrofluoric acid;

mixing and bringing the resulting acidic aqueous solution of the crude tantalum-containing compound into contact with an organic solution composed of a water-insoluble quaternary ammonium compound and a water-insoluble organic solvent, to extract the tantalum from said acidic aqueous solution into said organic solution;

mixing said organic solution with an aqueous solution containing at least one compound selected from the group consisting of an inorganic acid and an ammonium salt, to remove any of the impurities that have partly been extracted into said organic solution together with tantalum from said organic solution;

converting the tantalum in said organic solution to tantalum hydroxide by treatment with an alkali containing ammonium hydroxide; and precipitating said tantalum hydroxide and separating it, followed by calcining it to obtain high-purity tantalum pentoxide. The tantalum pentoxide has an extremely high purity as five to six nines (99.999% to 99.9999%).

11 Claims, No Drawings

METHOD OF PURIFYING TANTALUM

FIELD OF THE INVENTION

The present invention relates to a method of purifying impure or crude tantalum or tantalum compounds into high-purity tantalum compounds, especially tantalum pentoxide.

BACKGROUND OF THE INVENTION

Recent advancements in the electronics industry are remarkable and functional devices depend on new principles are being developed one after another. This requires upgrading of the purity of the materials of which these devices are made. High-purity tantalum and tantalum pentoxide are materials of increasing interest for fabricating surface acoustic wave filters, pyroelectric infrared sensors, optoelectronic devices and VLSI devices, and these materials are required to have a very high purity.

For example, surface acoustic wave filters and pyroelectric infrared sensors are made of lithium tantalate single crystal, and it is required to use high-purity tantalum pentoxide which does not contain iron, silicon, aluminum and niobium that will hinder higher yield and performance. For production of optical glass and optoelectronic devices such as optical switches and optical waveguides, it is also indispensable that the high-purity tantalum pentoxide used does not contain silicon or transition elements (e.g., iron, chromium and nickel) that would cause deteriorated performance, particularly increased light absorption loss.

Tantalum pentoxide is also used as a material for capacitors in a VLSI device and is required to be free from such alkali metal impurities as sodium and potassium that would deteriorate the performance of the device. This requirement is barely met by the conventional purity of two to three nines (99 to 99.9%) and considerable effort is being made to attain purities of the order of four to six nines (99.99 to 99.9999%).

Three methods, i.e., distillation, extraction and use of an anion exchange resin, are generally employed to obtain pure tantalum from crude tantalum or tantalum compounds containing impurities such as silicon, iron, copper, aluminum, niobium and calcium.

The distillation technique is described in, for example, German Pat. Nos. 1,017,601 and 1,056,105; this method depends on the difference between the boiling points of chlorides formed by chlorinating a mixture of tantalum or a tantalum compound and, for example, carbon with a chlorine gas supplied at about 600° to 800° C. However, the difference between the boiling point of tantalum chloride (239° C.) and that of niobium chloride (249° C.) is so small for industrial purposes that considerable difficulty is encountered in separating these chlorides by fractional distillation. Furthermore, if a chloride having a boiling point even closer to that of tantalum chloride is present, it is substantially impossible to separate the two chlorides and, as a result, high-purity tantalum pentoxide cannot be obtained.

The second method, extraction, is carried out by the following procedures: tantalum or a tantalum compound is dissolved in hydrofluoric acid; the resulting solution is brought into contact with an organic solvent made of an aliphatic ketone such as methyl ethyl ketone, cyclohexanone or methyl isobutyl ketone, whereby the tantalum in the acidic aqueous solution is extracted into the organic solvent, while the niobium extracted simultaneously into the organic solvent is removed by back extraction with dilute sulfuric acid or a sulfuric acid solution containing hydrofluoric acid; subsequently, the organic solution mainly containing tantalum is brought into contact with water or an aqueous solution containing one or more of dilute sulfuric acid, ammonium sulfate and ammonium fluoride, whereby the tantalum is extracted from the organic solvent into the aqueous solution, which is then hydrolyzed with aqueous ammonia to form a precipitate of tantalum hydroxide [Ta(OH)$_5$]; and the precipitate is recovered by filtration and calcined in air to form tantalum pentoxide [Ta$_2$O$_5$].

Alternatively, the aqueous solution of tantalum in hydrofluoric acid is brought into contact with an organic solvent made of an aliphatic phosphoric acid compound such as tributyl phosphate or bis(2-ethylhexyl)phosphoric acid, whereby the tantalum is extracted from the acidic aqueous solution into the organic solvent, which is then brought into contact with nitric acid so as to remove niobium by back extraction (see, for example, Japanese Patent Publication Nos. 13607/1963 and 18061/1963).

According to the method proposed in Japanese Patent Publication No. 29256/1983, the aqueous solution of tantalum in hydrofluoric acid is brought into contact with an organic solvent made of hydrocarbons of low polarity containing a tertiary alkylamine with a high molecular weight, whereby the tantalum is extracted from the acidic aqueous solution into the organic solvent, and subsequently niobium is removed from the organic solvent by back extraction with the tantalum-containing aqueous solution of hydrofluoric acid.

The principle of tantalum purification employed in these extraction techniques is the small difference that exists between tantalum and an impurity such as niobium with respect to affinity with the organic solvent, so the niobium cannot be completely removed by back extraction with dilute sulfuric acid or the aqueous solution of hydrofluoric acid and the tantalum pentoxide finally obtained contains several hundred ppm of niobium and is unable to provide a purity higher than the order of two to three nines (99 to 99.9%). For the small difference between tantalum and an impurity with respect to affinity with the organic solvent, if in order to obtain high-purity tantalum, the number of back extraction cycles is increased, the amount of tantalum transferred from the organic solvent into the back extract is also increased leading to causing a substantial decrease in the percent recovery of tantalum.

The third approach for tantalum purification depends on the use of an anion exchange resin: crude tantalum or an impure tantalum compound is dissolved in, for example, hydrofluoric acid; the resulting acidic aqueous solution containing tantalum is passed through a column packed with an anion exchange resin of the strongly basic quaternary ammonium type, so as to adsorb tantalum selectively on the anion exchange resin; thereafter, a metallic impurity that has been simultaneously adsorbed on the resin is removed by flushing with a strongly acidic aqueous solution containing hydrofluoric acid; and subsequently, tantalum is recovered by eluting the column with a mixed aqueous solution composed of hydrofluoric acid, aqueous ammonia and an ammonium salt. This method is described in, for example, Japanese Patent Application (OPI) No. 114831/1981, which states that the method is capable of providing high-purity tantalum pentoxide containing no more than a few ppm of tantalum of such metallic impurities as iron, silicon, copper, calcium, niobium, and aluminum. (The term "OPI" as used herein refers to a "published unexamined Japanese patent application".)

However, this method is not highly suitable for practical applications because the amount of tantalum that can be processed by a single cycle of column passage, flushing and elution is determined by the fairly small exchange capacity of the anion exchange resin (e.g., 1.0 to 1.5 mol Ta/liter-resin), and in order to apply this method on a commercial scale, a large quantity of the resin must be employed while the aforementioned complex batch operations are repeated quite a number of times.

Further problems arise from hydrolysis of tantalum during elution to cause precipitation of tantalum hydroxide on the anion exchange resin. First of all, in order to avoid formation of such precipitate, tantalum must be recovered by slowly dissolving it in an eluant but, then, this necessitates the use of an increased amount of eluant and prolongs the period of elution. Secondly, a large quantity of fluorine-containing effluents that require certain waste treatments are formed when tantalum is subsequently treated with aqueous ammonia to be precipitated in the form of tantalum hydroxide for recovery by filtration.

SUMMARY OF THE INVENTION

The present inventors made various studies with a view to developing an economical method for obtaining high-purity tantalum in high yield from crude tantalum or tantalum compounds containing impurities. As a result, the inventors found the following two facts. Firstly, when a tantalum-containing hydrofluoric acid aqueous solution wherein the crude tantalum or tantalum compound is dissolved in the form of tantalum-fluorine complex anions is mixed with an organic solution made of a water-insoluble quaternary ammonium compound and an organic solvent which is also water-insoluble, then the mixture is left to stand to cause phase separation, the tantalum-fluorine complex anions in the acidic aqueous solution are very efficiently and selectively extracted into the organic solution. Secondly, the quaternary ammonium compound has an extremely great affinity with the tantalum-fluorine complex anions in the organic solution as compared with its affinity with any other impurities, part of which may have been extracted together with tantalum, and, therefore, by means of mixing the organic solution and an aqueous washing solution containing an inorganic acid and or an ammonium salt, almost all of the impurities in the organic solution are transferred into the aqueous washing solution whereas no tantalum in the organic solution will be extracted into the washing solution.

The present invention has been accomplished on the basis of these findings. The use of a water-insoluble quaternary ammonium compound in tantalum purification has been entirely unknown in the art and it became possible to produce tantalum pentoxide with a purity of the order of five or six nines (99.999 to 99.9999%) on an industrial scale by the method of the present invention.

An object, therefore, of the present invention is to provide a method of purifying tantalum to obtain high-purity tantalum pentoxide that is suitable for use in electronics and optoelectronics industries and which is substantially free from impurities such as alkali metals, silicon, aluminum, and transition elements represented by iron and nickel.

DETAILED DESCRIPTION OF THE INVENTION

The method of the present invention proceeds as follows. In the first step, crude tantalum such as tantalum ores (e.g., tantalite, columbite and fergusonite) or impurity-containing tantalum compounds such as tantalum pentoxide, tantalum hydroxide, tantalates, fluorotantalates, tantalum-containing tin slags, tantalum scraps, shavings of single-crystal compounds such as lithium tantalate, or mixtures thereof are dissolved in an inorganic acid such as hydrofluoric acid, hydrochloric acid, nitric acid or sulfuric acid by usual methods to prepare an acidic aqueous solution containing tantalum in the form of a complex with fluorine.

In the prepared acidic aqueous solution, the impurity elements in the crude tantalum or tantalum compound are known to be present in different forms depending upon the type of element. Alkali metals such as lithium, sodium and potassium, alkaline earth metals such as calcium and magnesium, and elements such as cobalt, manganese, nickel and copper are present as cations; elements such as vanadium, iron, chromium, aluminum, titanium, silicon and zirconium are partly present as fluorine complex anions; and elements such as molybdenum, tin, niobium and tantalum are predominantly present as fluorine complex anions.

The present invention makes the most of the differences in the form in which the aforementioned impurity elements are present, and the difference between the affinity of a quaternary ammonium compound with the tantalum-fluorine complex anion and that with the impurity elements.

In a separate step from the preparation of the acidic aqueous solution, an organic solution containing a water-insoluble quaternary ammonium compound is prepared. The water-insoluble quaternary ammonium compound used in the present invention is represented by the following general formula:

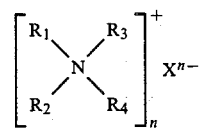

wherein $R_1$, $R_2$, $R_3$ and $R_4$ are each an alkyl or aralkyl group, with the total number of carbon atoms in $R_1$ to $R_4$ being 20 to 30; X is a halogen atom, a hydroxyl group, a nitrate group or a sulfate group; and n is 1 or 2. The presence of a non-polar group, preferably a non-polar hydrocarbon group having 6 to 17 carbon atoms, renders this quaternary ammonium compound soluble in organic solvents but insoluble in water or acidic or basic aqueous solutions. Specific examples of the water-insoluble quaternary ammonium compound include tri-n-octylmethylammonium chloride, tri-n-octylethylammonium chloride, tri-n-octylpropylammonium chloride, tri-n-octylbutylammonium chloride, tetrahexylammonium iodide, cetylbenzyldimethylammonium chloride, tri-n-octylmethylammonium hydroxide, bistri-n-octylmethylammonium sulfate, tri-n-octylmethylammonium nitrate, and bistetrahexylammonium sulfate.

The water-insoluble quaternary ammonium compound is dissolved in a water-insoluble organic solvent which is capable of causing phase separation from water. Illustrative organic solvents that satisfy this requirement include aromatic hydrocarbons such as benzene, toluene and xylene; hydrocarbons such as hexane, heptane, cyclohexane and kerosene; ethers such as diethyl ether and dipropyl ether; alcohols such as isoamyl alcohol, octanol and tridecyl alcohol; ketones such as methyl ethyl ketone and methyl isobutyl ketone; and halogenated hydrocarbons such as chloroform, carbon tetrachloride and dichloroethane. These organic solvents may be used either alone or in admixture.

The amount of the water-insoluble quaternary ammonium compound in the organic solution is equivalent to or more than the amount of tantalum present in the acidic aqueous solution in the form of a complex with fluorine. Preferably, the former is used in an amount of 1 to 1.5 moles, more preferably 1 to 1.2 moles, per mole of the latter.

In the second step, the acidic aqueous solution containing tantalum in the form of a complex with fluorine is mixed with the organic solution composed of the water-insoluble ammonium compound and the water-insoluble organic solvent by means of known fluid contacting apparatus such as a mixer-settler liquid-liquid extraction equipment or a pulse column liquid-liquid countercurrent extraction equipment. The flow ratio of the acidic aqueous solution to the organic solution is selected to be of such a value that the organic solution is fed in an amount containing at least an amount of the quaternary ammonium compound which is sufficient to ensure complete extraction of tantalum from the acidic aqueous solution.

As a result of this liquid phase contact, tantalum present in the form of a complex with fluorine in the acidic aqueous solution is selectively extracted therefrom into the organic solution, while impurity elements present in the acidic aqueous solution (i.e., those which form little or no complex with fluorine) are not substantially extracted into the organic solution. That is, the resulting organic solution may contain very small amount of impurities such as niobium but its solute component is substantially made of tantalum only.

The obtained organic solution which substantially contains tantalum only is then freed of any impurities by mixing with a washing aqueous solution at a flow ratio of about 1:1 to 1:10 by a known fluid contacting means. The washing aqueous solution is an aqueous solution containing at least one compound selected from the group consisting of an inorganic acid and an ammonium salt. Specific examples of the washing aqueous solution are an aqueous solution containing at least one compound selected from the group consisting of inorganic acids such as hydrochloric acid, nitric acid and sulfuric acid and ammonium salts such as ammonium fluoride, ammonium chloride, ammonium nitrate and ammonium sulfate; and an aqueous solution containing hydrofluoric acid in addition to at least one compound selected from the foregoing inorganic acids and ammonium salts.

The total concentration of the inorganic acid and ammonium salt (excluding hydrofluoric acid, if any) present in the washing aqueous solution preferably ranges from 0.5 to 8.0 mol/l, more preferably from 2 to 4 mol/l. If the total concentration of the inorganic acid and ammonium salt is less than 0.5 mol/l, rapid removal of the impurities from the tantalum-containing organic solution will not be realized. No significant improvement in the removal of impurities can be provided by using the inorganic acid and/or ammonium salt in a total concentration exceeding 8.0 mol/l. The concentration of hydrofluoric acid that may be present in the washing aqueous solution should preferably not exceed 3 mol/l, with 1 mol/l or below being more preferred. If hydrofluoric acid is present in an amount greater than 3 mol/l, rapid removal of the impurities cannot be ensured.

While the tantalum-containing organic solution is mixed with the washing aqueous solution, tantalum is strongly retained within the organic solution and will not be lost by extraction into the washing aqueous solution. On the other hand, the impurities that have, together with tantalum, been partly extracted into the organic solution in the second step will be transferred almost completely into the washing aqueous solution. Therefore, the resulting organic solution will contain a very pure form of tantalum accompanied by not more than a few ppm of impurities with respect to tantalum.

In the fourth step, the organic solution containing only tantalum is mixed with an aqueous solution containing aqueous ammonia and an ammonium salt by a routine method, so as to extract tantalum into the aqueous solution. The tantalum-containing aqueous solution is then mixed with aqueous ammonia to adjust the pH at about 8 to 9 so that tantalum is precipitated as tantalum hydroxide and separates from the aqueous phase. The precipitate is recovered and dehydrated by calcination at about 900° C., whereby the desired high-purity tantalum pentoxide is obtained. On the other hand, the organic solution containing the quaternary ammonium compound from which tantalum has been extracted may, without loss, be recycled for further use either directly or after treatment with hydrochloric acid, nitric acid, sulfuric acid, etc.

The method of the present invention described above has the following advantages.

(1) The method utilizes the great differences that exist between the tantalum-fluorine complex anions and other impurities with respect to their affinity with the water-insoluble quaternary ammonium compound, so it is effective for removing non-tantalum impurity elements, particularly, for example, alkali metals, silicon, aluminum, and transition elements like iron. The method is therefore capable of efficient production of a very pure form of tantalum pentoxide with impurity contents of not more than a few ppm.

(2) The method permits recycled use of both the quaternary ammonium compound and the organic solvent. A further economic advantage in terms of purification costs will result from the fact that the method discharges less fluorine-containing effluents that require waste treatments.

(3) The method can be performed using well known simple extraction apparatus and its adaptability to continuous and automated operations will lend itself to substantial cost reductions and increases in productivity.

The following examples are provided for the purpose of further illustrating the present invention but are by no means intended as limiting.

EXAMPLE 1

Crude tantalum pentoxide as a feed containing 61.4% tantalum, 8.1% niobium, 4.2% iron, 2.6% silicon, 1.6% aluminum, 0.7% calcium and 0.4% copper (all percents are by weight) and trace amounts of sodium, antimony and manganese was dissolved in hydrofluoric acid to prepare an acidic aqueous solution containing 4.0 wt% of tantalum in the form of a fluorine complex. An 80% pure tri-n-octylmethylammonium chloride was dissolved in toluene to prepare an organic solution with the chloride's concentration being 9.0 wt%.

The acidic aqueous solution and the organic solution were fed at a flow ratio of 1:1.3 into a 5-stage mixer-settler liquid-liquid extraction apparatus, where the two solutions were brought into concurrent contact with each other so as to extract tantalum from the acidic aqueous solution into the organic solution. Then, the organic solution into which tantalum had been extracted and a washing aqueous solution containing 3 mol/l of nitric acid and 0.1 mol/l of hydrofluoric acid were fed at a flow rate of 1:5 into a 5-stage mixer-settler liquid-liquid extraction apparatus, where the two solutions were brought into concurrent contact with each other so as to remove all non-tantalum impurities from the organic solution by extraction into the washing aqueous solution.

After washing, the organic solution was treated with an aqueous solution containing aqueous ammonia and ammonium nitrate, whereby tantalum was extracted into the aqueous phase. The aqueous phase was mixed with aqueous ammonia to adjust the pH at 8 to 9 and to precipitate tantalum as tantalum hydroxide. The precipitate was recovered by filtration and washed with warm water. The washed precipitate was heated at about 900° C. in an platinum crucible to obtain the pure form of tantalum pentoxide. The percent recovery of the product tantalum pentoxide and its impurity contents are shown in Table 1.

TABLE 1

| Metallic Element (ppm) | | | | | | | | | Percent |
|---|---|---|---|---|---|---|---|---|---|
| Nb | Fe | Si | Al | Ca | Cu | Na | Sb | Mn | Recovery |
| 0.5> | 0.5 | 0.5 | 0.5> | 0.5> | 0.5> | 0.5> | 0.5> | 0.5> | 98.7% |

EXAMPLE 2

A metallic crude powder as a feed containing 94% tantalum, 1.2% iron, 1.1% nickel, 0.5% tungsten and 0.1% chromium (all percents are by weight) and trace amounts of, as impurities, niobium, silicon, aluminum, calcium and magnesium was dissolved in hydrofluoric acid to prepare an acidic aqueous solution containing 4.0% of tantalum in the form of a fluorine complex. An 80% pure tri-n-octylmethylammonium chloride was dissolved in isoamyl alcohol to prepare an organic solution with the chloride's concentration being 9.0 wt%.

The acidic aqueous solution and the organic solution were fed at a flow rate of 1:1.3 into a 5-stage mixer-settler liquid-liquid extraction apparatus, where the two solutions were brought into concurrent contact with each other so as to extract tantalum from the acidic aqueous solution into the organic solution. Then, the organic solution into which tantalum had been extracted and a washing aqueous solution containing 2 mol/l of hydrochloric acid, 1 mol/l of ammonium fluoride and 0.1 mol/l of hydrofluoric acid were fed at a flow rate of 1:5 into a 5-stage mixer-settler liquid-liquid extraction apparatus, where the two solutions were brought into concurrent contact with each other so as to remove all non-tantalum impurities from the organic solution by extraction into the washing aqueous solution. Thereafter, the organic solution was treated in the same manner as in Example 1 to obtain the pure form of tantalum pentoxide. The percent recovery of the product tantalum pentoxide and its impurity contents are shown in Table 2.

TABLE 2

| Metallic Element (ppm) | | | | | | | | | Percent |
|---|---|---|---|---|---|---|---|---|---|
| Fe | Ni | W | Cr | Nb | Si | Al | Ca | Mg | Recovery |
| 1 | 0.5 | 0.5 | 1 | 0.5> | 0.5 | 0.5> | 0.5> | 0.5> | 97.9% |

EXAMPLE 3

Crude tantalum hydroxide as a feed containing 85.3% tantalum pentoxide, 10.7% water, 1.5% niobium, 0.2% iron, 0.1% silicon and 0.7% calcium (all percents are by weight) and trace amounts of sodium, potassium, manganese and tin was dissolved in hydrofluoric acid to prepare 2 liters of an acidic aqueous solution containing 8.6 wt% of tantalum in the form of a fluorine complex. An 80% pure tri-n-octylethylammonium chloride was dissolved in chloroform to prepare 2 liters of an organic solution with the chloride's concentration being 14.6%.

The acidic aqueous solution and the organic solution were fed into a 5-liter extraction vessel equipped with a stirrer where the two solutions were mixed under agitation for about 1 hour and thereafter were left to stand to cause phase separation. Almost all of the tantalum present in the acidic aqueous solution was extracted into the phase of chloroform solution, and aside from niobium (92 ppm), the impurity elements in this phase were at trace levels.

After removing the phase of acidic aqueous solution, the organic solution into which tantalum had been extracted and 2 liters of a washing aqueous solution containing 1 mol/l of sulfuric acid and 2 mol/l of ammonium fluoride were mixed with agitation for about 1 hour and the mixture was left to stand to cause phase separation, followed by removal of the aqueous phase. These washing operations were repeated a total of three times, whereby all impurities were removed from the organic phase.

After washing, the organic solution containing tantalum and the quaternary ammonium salt was mixed with aqueous ammonia until the pH became 8 to 9 and tantalum was hydrolyzed to form a precipitate of tantalum hydroxide. The precipitate was recovered by filtration, washed with pure water, and heated at 900° C. for 2 hours to obtain tantalum pentoxide in its pure form. The percent recovery of the product tantalum pentoxide and its impurity contents are shown in Table 3.

TABLE 3

| Metallic Element (ppm) | | | | | | | | Percent |
|---|---|---|---|---|---|---|---|---|
| Nb | Fe | Si | Ca | Na | K | Mn | Sn | Recovery |
| 0.5> | 0.5> | 0.5> | 0.5> | 0.5> | 0.5> | 0.5> | 0.5> | 97.2% |

EXAMPLE 4

Crude tantalite as a feed containing 31.9% tantalum, 21.3% niobium, 7.5% iron, 4.8% manganese, 1.1% silicon and 0.1% tin (all percents are by weight) and trace amounts of aluminum, zirconium, titanium, lead, zinc, calcium, chromium, magnesium and nickel was dissolved in a mixed acid of hydrofluoric acid and sulfuric acid to prepare 2 liters of an acidic aqueous solution containing 3.1 wt% of tantalum in the form of a fluorine complex. An 80% pure tri-n-octylbutylammonium chloride was dissolved in xylene to prepare 2 liters of an organic solution with the chloride's concentration being 4.8%.

The acidic aqueous solution (2 liters) and the organic solution (2 liters) were fed into a 5-liter extraction vessel equipped with a stirrer where the two solutions were mixed with agitation for about 1 hour and thereafter were left to stand to cause phase separation. In the organic solution phase, 99.2% of tantalum and 1.1% of niobium were extracted, and aside from iron (22 ppm) and manganese (18 ppm), no impurity elements were detected in the organic solution.

After removing the phase of acidic aqueous solution, the organic solution containing tantalum and the quaternary ammonium salt, and 2 liters of a washing aqueous solution made of 3 mol/l of nitric acid and 0.1 mol/l of hydrofluoric acid were mixed with agitation for about 1 hour and the mixture was left to stand to cause phase separation, followed by removal of the aqueous phase. These washing operations were repeated a total of three times, whereby any impurities that had been extracted into the organic phase together with tantalum were removed. No elements other than tantalum were detected in the organic solution.

After washing, the xylene solution was mixed with aqueous ammonia until the pH became 8 to 9 and tantalum was hydrolyzed to form a precipitate of tantalum hydroxide. The precipitate was washed with pure water and heated at 900° C. for 2 hours to obtain tantalum pentoxide in its pure form. The percent recovery of the product tantalum pentoxide and its impurity contents are shown in Table 4.

TABLE 4

| Metallic Element (ppm) | | | | | | | | | | | | | | Percent |
| Nb | Fe | Mn | Si | Sn | Al | Zr | Ti | Pb | Zn | Ca | Cr | Mg | Ni | Recovery |
|---|---|---|---|---|---|---|---|---|---|---|---|---|---|---|
| 2 | 1 | 0.5> | 1 | 0.5> | 1 | 0.5> | 0.5> | 0.5> | 0.5> | 0.5> | 0.5> | 0.5> | 0.5> | 92.7% |

EXAMPLES 5 TO 9

Crude tantalum pentoxide was purified in the same manner as in Example 1 using an acidic aqueous solution containing tantalum in the form of a fluorine complex the same as that used in Example 1. The compositions of the organic solutions and washing aqueous solutions employed in Examples 5 to 9 are listed below.

| Example No. | Organic solution made of sparingly water-soluble quaternary ammonium compound and sparingly water-soluble organic solvent | Washing aqueous solution |
|---|---|---|
| 5 | 9.0% tri-n-octylmethyl-ammonium chloride dissolved in 1:1 mixture of toluene and cyclohexane | mixture of 2 mol/l nitric acid, 1 mol/l ammonium fluoride and 0.1 mol/l hydrofluoric acid |
| 6 | 8.6% tri-n-octylmethyl-ammonium hydroxide dissolved in isoamyl alcohol | mixture of 2 mol/l nitric acid, 1 mol/l ammonium nitrate and 0.1 mol/l hydrofluoric acid |
| 7 | 9.6% tri-n-octylmethyl-ammonium nitrate dissolved in toluene | 3 mol/l nitric acid |
| 8 | 10.7% tetra-n-hexylammonium iodide dissolved in diethyl ether | mixture of 2 mol/l sulfuric acid and 1 mol/l ammonium fluoride |
| 9 | 8.9% bistri-n-octylmethyl-ammonium sulfate dissolved in benzene | mixture of 3 mol/l nitric acid and 0.1 mol/l hydrofluoric acid | tantalum pentaoxide and their impurity contents are shown in Table 5.

TABLE 5

| Example No. | Metallic Element (ppm) | | | | | | | | | Percent Recovery (%) |
| | Nb | Fe | Si | Al | Ca | Cu | Na | Sb | Mn | |
|---|---|---|---|---|---|---|---|---|---|---|
| 5 | 1 | 1 | 0.5 | 0.5> | 0.5> | 0.5> | 0.5> | 0.5> | 0.5> | 98.5 |
| 6 | 1 | 2 | 1 | 0.5> | 0.5> | 0.5> | 0.5> | 0.5> | 0.5> | 99.0 |
| 7 | 1 | 2 | 2 | 1 | 0.5 | 0.5> | 0.5> | 0.5> | 0.5> | 96.8 |
| 8 | 2 | 3 | 1 | 0.5> | 1 | 0.5> | 0.5> | 0.5> | 0.5> | 97.3 |
| 9 | 1 | 1 | 1 | 0.5 | 0.5> | 0.5> | 0.5> | 0.5> | 0.5> | 96.5 |

While the invention has been described in detail and with reference to specific embodiments thereof, it will be apparent to one skilled in the art that various changes and modifications can be made therein without departing from the spirit and scope thereof.

What is claimed is:

1. A method for obtaining high-purity tantalum pentoxide comprising the following steps:
    dissolving a crude tantalum-containing compound in an acid containing hydrofluoric acid;
    mixing and bringing the resulting acidic aqueous solution of the crude tantalum-containing compound into contact with an organic solution composed of a water-insoluble quaternary ammonium compound and a water-insoluble organic solvent, to extract the tantalum from said acidic aqueous solution into said organic solution;
    mixing said organic solution with an aqueous solution containing at least one compound selected from the group consisting of an inorganic acid and an ammonium salt, to remove any of the impurities that have partly been extracted into said organic solution together with tantalum from said organic solution;
    converting the tantalum in said organic solution to tantalum hydroxide by treatment with an alkali containing ammonium hydroxide; and
    precipitating said tantalum hydroxide and separating it, followed by calcining it to obtain high-purity tantalum pentoxide.

2. A method according to claim 1, wherein the water-insoluble quaternary ammonium compound is a quaternary ammonium compound having the formula:

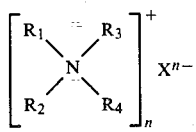

wherein $R_1$, $R_2$, $R_3$ and $R_4$ are each an alkyl or aralkyl group, with the total number of carbon atoms in $R_1$ to $R_4$ being 20 to 30; X is a halogen atom, a hydroxyl group, a nitrate group or a sulfate group; and n is 1 or 2.

3. A method according to claim 2, wherein the quaternary ammonium compound is selected from tri-n-octylmethylammonium chloride, tri-n-octylethylammonium chloride, tri-n-octylpropylammonium chloride, tri-n-octylbutylammonium chloride, tetrahexylammonium iodide, cetylbenzyldimethylammonium chloride, tri-n-octylmethylammonium hydroxide, bistri-n-octylmethylammonium sulfate, tri-n-octylmethylammonium nitrate, and bistetrahexylammonium sulfate.

4. A method according to claim 1, wherein the organic solvent for dissolving the water-insoluble quaternary ammonium compound is an aromatic hydrocarbon selected from benzene, toluene and xylene, a hydrocarbon selected from hexane, heptane, cyclohexane and kerosene, an ether selected from diethyl ether and dipropyl ether, an alcohol selected from isoamyl alcohol, octanol and tridecyl alcohol, a ketone selected from methyl ethyl ketone and methyl isobutyl ketone, a halogenated hydrocarbon selected from chloroform, carbon tetrachloride and dichloroethane, or mixtures thereof.

5. A method according to claim 1, wherein the crude tantalum-containing compound is tantalum pentoxide, tantalum hydroxide, a tantalate, a fluorotantalate, a tantalum ore selected from tantalite, columbite and fergusonite, a tantalum-containing tin slag, a tantalum scrap, and shavings of a single-crystal compound of lithium tantalate.

6. A method according to claim 1, wherein the acid in which the crude tantalum-containing compound is dissolved is hydrofluoric acid taken independently or in mixture with an acid selected from sulfuric acid, nitric acid and hydrochloric acid.

7. A method according to claim 1, wherein the aqueous solution containing at least one compound selected from the group consisting of an inorganic acid and an ammonium salt is an aqueous solution containing at least one of hydrochloric acid, nitric acid, sulfuric acid, ammonium fluoride, ammonium chloride, ammonium nitrate and ammonium sulfate.

8. A method according to claim 1, wherein the aqueous solution containing at least one compound selected from the group consisting of an inorganic acid and an ammonium salt is an aqueous solution containing hydrofluoric acid and at least one compound selected from the group consisting of hydrochloric acid, nitric acid, sulfuric acid, ammonium fluoride, ammonium chloride, ammonium nitrate and ammonium sulfate.

9. A method according to claim 7, wherein the total concentration of the inorganic acid and the ammonium salt in the aqueous solution is in the range of 0.5 to 8.0 mol/l.

10. A method according to claim 8, wherein the total concentration of the inorganic acid excluding hydrofluoric acid and the ammonium salt in the aqueous solution is in the range of 0.5 to 8.0 mol/l and the concentration of the hydrofluoric acid is not more than 3 mol/l.

11. A method according to claim 1, wherein the water-insoluble quaternary ammonium compound in the organic solution is used in an amount of 1 to 1.5 moles per mole of the tantalum present in the acidic aqueous solution.

* * * * *